United States Patent
Johns

(10) Patent No.: US 11,833,501 B2
(45) Date of Patent: Dec. 5, 2023

(54) UNIVERSAL TUBE MARKER FOR IDENTIFYING CHEMICAL REACTOR TUBES ACCURATELY AND EFFICIENTLY

(71) Applicant: Tubemaster, Inc., Louisville, KY (US)

(72) Inventor: Clifford L. Johns, Louisville, KY (US)

(73) Assignee: Tubemaster, Inc., Louisville, KY (US)

( * ) Notice: Subject to any disclaimer, the term of this patent is extended or adjusted under 35 U.S.C. 154(b) by 0 days.

(21) Appl. No.: 17/660,023

(22) Filed: Apr. 20, 2022

(65) Prior Publication Data

US 2022/0387953 A1 Dec. 8, 2022

Related U.S. Application Data

(60) Provisional application No. 63/176,964, filed on Apr. 20, 2021.

(51) Int. Cl.
*B01J 8/06* (2006.01)

(52) U.S. Cl.
CPC ........ *B01J 8/06* (2013.01); *B01J 2219/00245* (2013.01); *B01J 2219/00547* (2013.01)

(58) Field of Classification Search
CPC .. B01J 8/06; B01J 8/0015; B01J 2208/00743; B01J 2208/00769
See application file for complete search history.

(56) References Cited

U.S. PATENT DOCUMENTS

| | | | |
|---|---|---|---|
| 4,777,911 A | 10/1988 | Wepfer | |
| 6,779,590 B2 | 8/2004 | Pineda et al. | |
| 6,981,422 B1 | 1/2006 | Comardo | |
| 8,063,778 B2 * | 11/2011 | Johns | B01J 8/008 340/568.1 |
| 9,034,110 B2 * | 5/2015 | Johns | F28G 1/12 134/22.18 |
| 2004/0194921 A1 | 10/2004 | Dimartino | |
| 2011/0000643 A1 | 1/2011 | Kim et al. | |
| 2021/0065356 A1 | 3/2021 | Fisher et al. | |

* cited by examiner

*Primary Examiner* — Lessanework Seifu
(74) *Attorney, Agent, or Firm* — Duncan Galloway Greenwald PLLC; Kevin T. Duncan

(57) ABSTRACT

A sector marker for placement over a tubesheet and defining an opening for performing maintenance on an open tube located below the sector marker, the sector marker positioned over the tubesheet by at least two pins extending below the sector marker and respectively received in tube openings below the sector marker. A device and a method for easily and accurately marking and identifying the location of the tubes in a reactor vessel and for keeping track, in real-time, of the tasks performed on the tubes.

10 Claims, 17 Drawing Sheets

UNIVERSAL TUBE MARKER FOR IDENTIFYING CHEMICAL REACTOR TUBES ACCURATELY AND EFFICIENTLY

CROSS-REFERENCE TO RELATED APPLICATION

The present invention claims the benefit of priority to U.S. Prov. Pat. App. No. 63/176,964, entitled Universal Tube Marker for Identifying Chemical Reactor Tubes Accurately and Efficiently, Clifford L. Johns, filed Apr. 2, 2021 which is incorporated by reference herein in the entirety.

BACKGROUND

A first inventive aspect relates to a system, device and method for uniquely identifying chemical reactor tubes accurately and efficiently.

A second inventive aspect relates to a system, device and method for improved organize tubes for improved loading operations associated with chemical reactor tubes.

A third inventive aspect relates to a system, device and method for improved caps or plugs in connection with identifying chemical reactor tubes accurately and efficiently for improved cleaning and loading operations.

A fourth inventive aspect relates to a system, device and method for uniquely identifying chemical reactor tubes accurately and efficiently.

Many chemical reactors are essentially large shell and tube heat exchanger vessels, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with from 10 to 5,000 or more such tubes. In any of these reactor vessels, catalyst, typically in the form of pellets, may be loaded into the reactor to facilitate the reaction. The catalyst is replaced periodically.

The reactor tubes may be quite long, housed in a structure several stories tall. In order to replace the catalyst, the old, spent catalyst must first be removed from the reactor tubes. The inside surface of the tubes is then mechanically cleaned to remove any scale formed during the chemical reaction process as this scale impedes or retards the reaction by slowing down the heat transfer rate.

When loading, emptying, or cleaning the tubes, it can be difficult to keep track of which tubes have been worked on. What is needed are systems and methods that can: 1)

SUMMARY

The present invention relates to a device and method for uniquely identifying each of the plurality of tubes in a chemical reactor and keeping track of tasks performed on each tube and the overall progress on the work done on the chemical reactor.

The tasks may include removing the spent catalyst from each of the reactor tubes (also referred to as unloading the catalyst pellets from each reactor tube) by inserting an air lance into the end of each tube to dislodge the catalyst pellets, or by inserting a fish tape into the end of each tube, again to dislodge the catalyst pellets. Another task may involve grit blasting each reactor tube using a hose carrying a compressed air/blast grit mix to clean out each tube once the catalyst pellets have been unloaded. Yet another task may involve running a "pig" or swab through each tube to ensure that each tube is fully unloaded and clean. Other tasks may involve loading fresh catalyst back into each reactor tube and finally doing a "pressure drop" test through each reactor tube to check on the accuracy of the catalyst loading procedure.

An embodiment of the present invention provides a variety of different embodiments of markers, each of which has a unique identifier. Each marker is assigned to a unique tube position (row and tube number) on the tubesheet of the reactor, or to a unique sector of the tubesheet covering a plurality of tubes on a tubesheet. In one embodiment, each marker has the ability to be removed and reinserted in a different orientation to give a visual indication of a completed task for that particular tube. The information of the unique tube identifier, including the exact tube location (row # and tube #) is scanned and streamed to a database as the work is being conducted, and the relevant information can be displayed to provide an accurate, real-time status update of the condition of the tubes in the reactor.

A first embodiment of the present invention provides a method for keeping track of chemical reactor tubes when performing a task on the tubes, comprising the steps of: providing a sector marker for placement over a tubesheet, the sector marker defining an opening for performing maintenance on an open tube located below the sector marker; positioning the sector marker over the tubesheet by at least two pins extending below the sector marker; respectively inserting the at least two pins in at least two tube openings below the sector marker; and performing maintenance on the open tube.

The first embodiment may be further characterized by one or more of the following manners: repositioning the sector marker in progressive fashion to perform maintenance successively on a plurality of open tubes; inserting a unique marker into each open tube, said unique marker bearing a unique code; using a code reader to read the unique code on each unique inserted marker and correlate that unique code with the unique tube location into which the respective marker is inserted to establish a digital map of the tube locations and the unique codes associated with the tube locations; then, when beginning the task, using a code reader to read the code on the marker in the specific tube on which the task is to be performed, then performing the task, and then generating a signal indicating that the task has been completed for that specific coded tube; and repeating these steps for the plurality of open tubes; and removing a cap or plug disposed on the open tube during maintenance operation with the defined opening being configured to permit removal of a cap or plug disposed on the open tube.

A second embodiment of the present invention provides a sector marker for placement over a chemical reactor tubesheet, the sector marker comprising: a generally flat and rigid body having a relatively thin cross-section and defining an opening therethrough, the opening having dimensions configured to permit access to an open tube located below the sector marker for performing maintenance thereon; at least two pins extending below the sector marker; wherein by respectively inserting the at least two pins in at least two tube openings below the sector marker, the sector marker is positioned and temporarily secured over the tubesheet for performing maintenance on the open tube.

The first embodiment may be further characterized by one or more of the following manners: wherein the generally flat and rigid body is generally in the shape of a parallelogram; wherein the opening is defined generally in the center of the sector marker body; further comprising: a unique marker configured to be inserted into each open tube, said unique marker bearing a unique code; a code reader adapted to read the unique code on each unique inserted marker and correlate that unique code with the unique tube location into which the respective marker is inserted to establish a digital map of the tube locations and the unique codes associated with the tube locations; then, when beginning the task, using a code reader to read the code on the marker in the specific tube on which the task is to be performed, then performing the task, and then generating a signal indicating that the task has been completed for that specific coded tube.

A third embodiment of the present invention provides a sector marker for placement over a chemical reactor tubesheet, the sector marker comprising: a generally flat and rigid body having a relatively thin cross-section and defining an opening therethrough, the body having a pre-defined shaped template configured to fit over a first set of tubes adjacent a tube sheet, the opening configured to permit access to an open tube located below the sector marker for performing maintenance thereon; a set of at least two pins extending below the sector marker and located at or near a periphery of the sector marker body and configured to be received within respective at least two tube openings to secure the sector marker to the tubesheet at a desired location; wherein the sector marker is adapted to be repositioned over the tubesheet by respectively inserting the at least two pins in at least two other tube openings below the sector marker for performing successive maintenance on a plurality of open tubes.

DESCRIPTION

Figure 1:
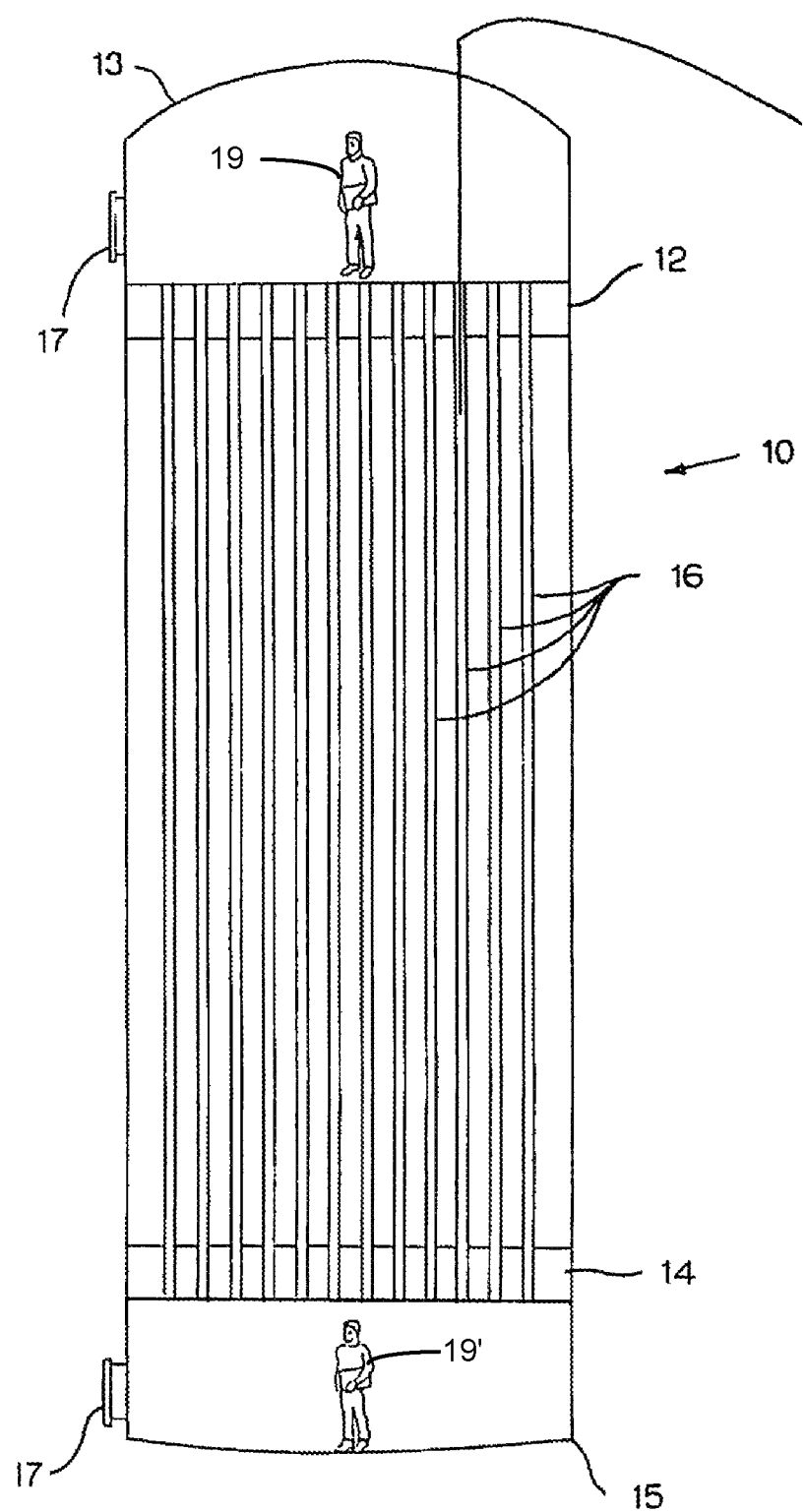
FIG. 1 is a schematic, section view of a shell and tube type of chemical reactor vessel.

FIG. 1 depicts a typical chemical reactor vessel 10, which is a shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of cylindrical tubes 16 (See also FIG. 2) extending between the tubesheets 12, 14. Each tube 16 has a top end secured to the upper tubesheet 12 and a bottom end secured to the lower tubesheet 14, and the tubes 16 are open at both ends, except that there may be a spring, clip or grid at the bottom end of each tube 16 to retain catalyst pellets inside the tube. The upper and lower tubesheets 12, 14 have openings that are the size of the outside diameter of the tubes 16, with each tube 16 being located in respective openings in the upper and lower tubesheets 12, 14.

The vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling and tube cleaning operations. In this instance, the tubes 16 are filled with catalyst pellets, which facilitate the chemical reaction. (It may be noted that similarly-shaped shell and tube heat exchangers may be used for other purposes, such as for a boiler or other heat exchanger.) Other, non-catalyst pellets, such as filler pellets, also may be inside the tube, and they are referred to herein as catalyst pellets as well.

Reactors have either fixed or removable heads. In this embodiment, the heads are fixed, and they include manways 17 at the top and at the bottom in order to provide access to their respective domes.

This particular reactor vessel 10 is fairly typical. Its tubes 16 can range in length from 5 feet to 65 feet, and it is surrounded by a structural steel skid or framework (not shown), which includes stairways or elevators for access to the tubesheet levels of the reactor vessel 10 as well as access to intermediate levels, to a topmost level which may be located at or near the level of the top opening of the reactor vessel 10, and to a lower level which may be located at or near the level of the lower dome 15 of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons.

Part of the catalyst change operation involves unloading (removing) the catalyst pellets in the reactor tubes 16 and then cleaning the inside surface of the reactor tubes 16 to remove any scale that may have formed inside the tubes 16. The scale inhibits the heat transfer across the wall of the tubes 16, and it is therefore desirable to remove the scale prior to reloading fresh catalyst pellets inside the reactor tubes 16.

The removal of the catalyst pellets from the reactor tubes has traditionally been accomplished either by air lancing assisted by vacuuming the dislodged catalyst pellets (typically done from the top of the tubes), or by fish taping (typically done from the bottom of the tubes).

The cleaning/removal of the scale has traditionally been accomplished by grit-blasting. An operator 19 (See FIG. 1, not to scale), stands on the top tube sheet (when grit blasting is to be from the top end of the tube) or the operator 19' stands in the bottom dome 15 of the reactor vessel 10 or on a temporary service platform to make such work more practical when it is alternatively done from the bottom end of the tube. In each case, the operator physically rams the end of a nozzle into the top end or bottom end of a reactor tube 16 and then turns on a flow of grit-laden compressed air to flow through the nozzle and into the tube 16 being cleaned.

After the tubes 16 have been grit blasted, they may be swabbed by running a "pig" through each tube to confirm that each tube is clear (no remaining catalyst pellets in the tube) and that each tube is clean with no discoloration indicating the possible presence of rust and therefore incomplete cleaning of the inside of the reactor tube. As indicated earlier, each tube 16 may then be reloaded with fresh catalyst and, finally, each tube 16 may be "pressure drop" tested to ensure a consistent, good quality loading of the catalyst pellets inside each tube 16.

The tasks described above are performed by several workers. It is advantageous to be able to identify each tube before a task is performed on the tube as well as after the task has been performed and to keep track as the work is being done to ensure that all tubes have been worked on and that no tube has been missed. It is advantageous to have a visual indication of the work progress right on the tubesheet, as well as on a digital record that can be updated in real time.

One embodiment of the present invention is shown in FIGS. 4-14. Referring briefly to FIGS. 4-7, a marker 18 for marking a tube includes a ring 20 and an insert 22. The ring 20 defines a tubular through opening 24 with enlarged upper and lower circular recesses 26, 28.

The outside diameter of the ring 20 is at least slightly larger than the inside diameter of the tubes 16 (See also FIG. 8) in which it is designed to be used. The inside diameter of the tubular opening 24 need only be as large as required to allow a set of legs of the insert 22 to pass through the opening 24 in a compressed position. The inside diameter of each of the enlarged recesses 26, 28, should be larger than the inside diameter of the central portion of the opening 24 and smaller than the outside diameter of the ring 20. The ring 20 preferably is manufactured from a tough material such as an ABS plastic or even out of metal so it can stand up to repeated abuse, including foot traffic by technicians as they walk across the tubesheet.

Figure 4:
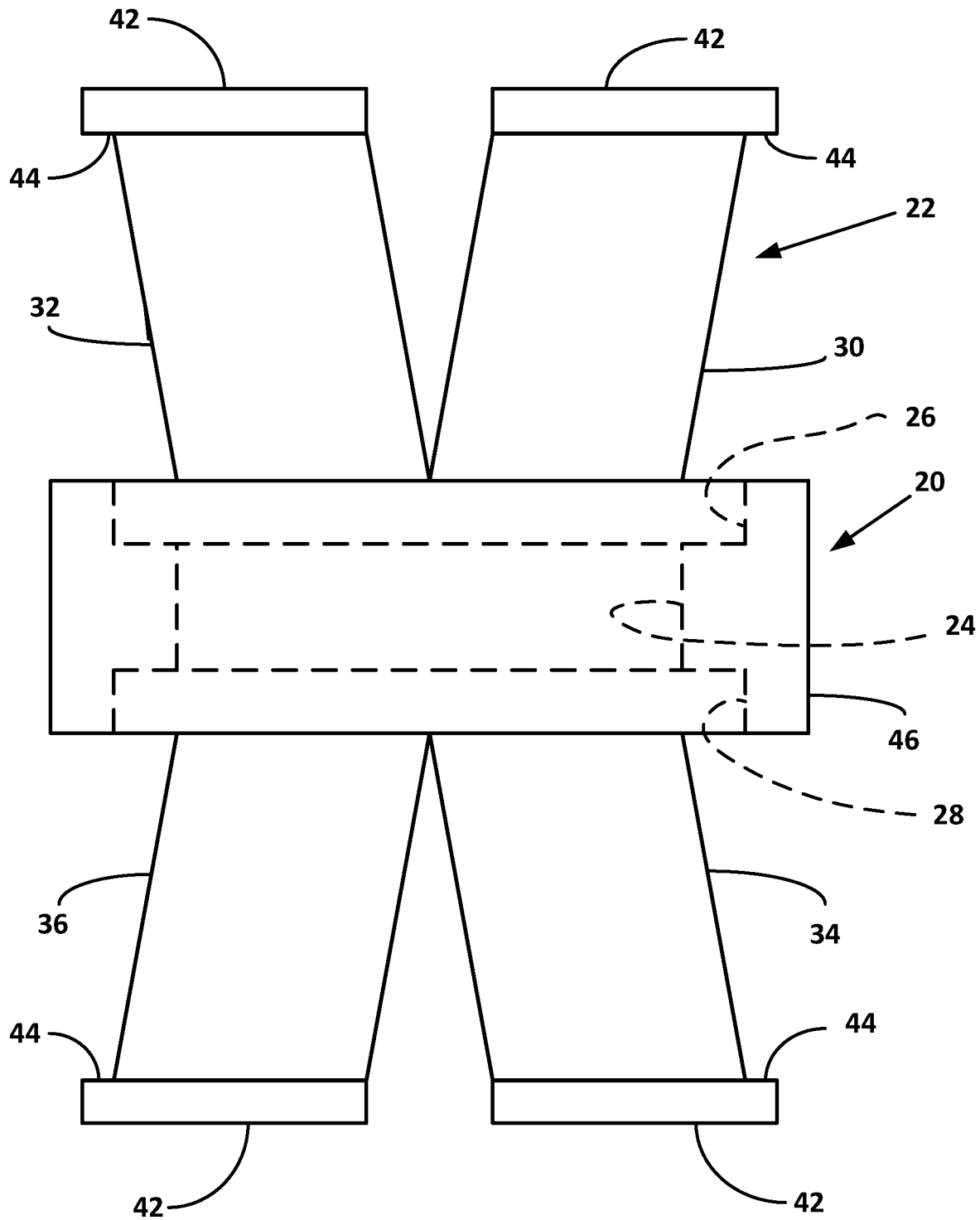
FIG. 4 is a side view of a two-piece, universal marker, showing both a ring and an insert in a neutral position.
Figure 5:
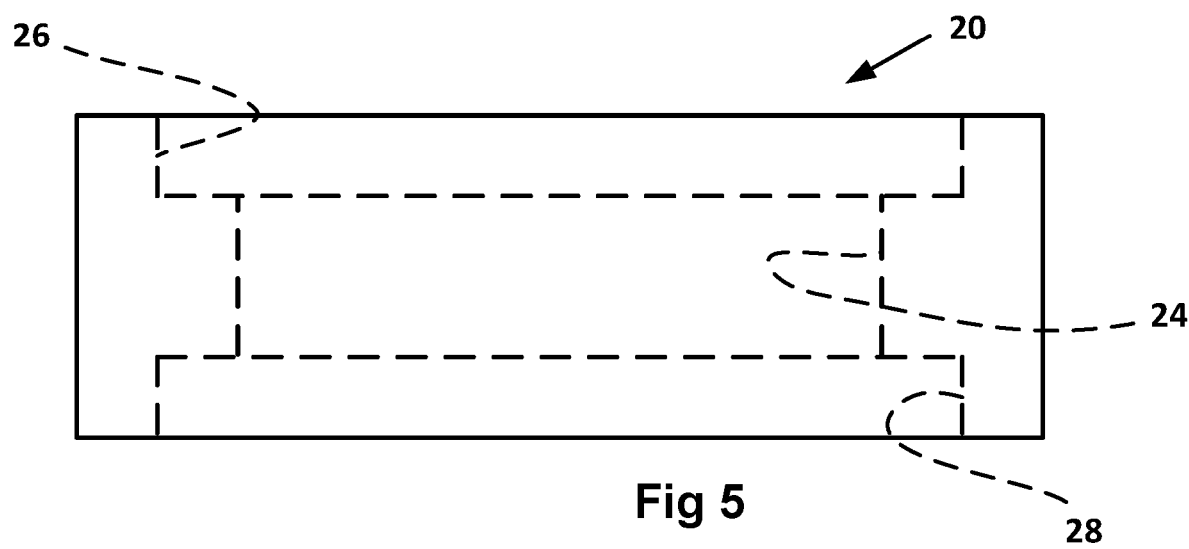
FIG. 5 is a side view of the ring of the two-piece marker of FIG. 4.
Figure 6:
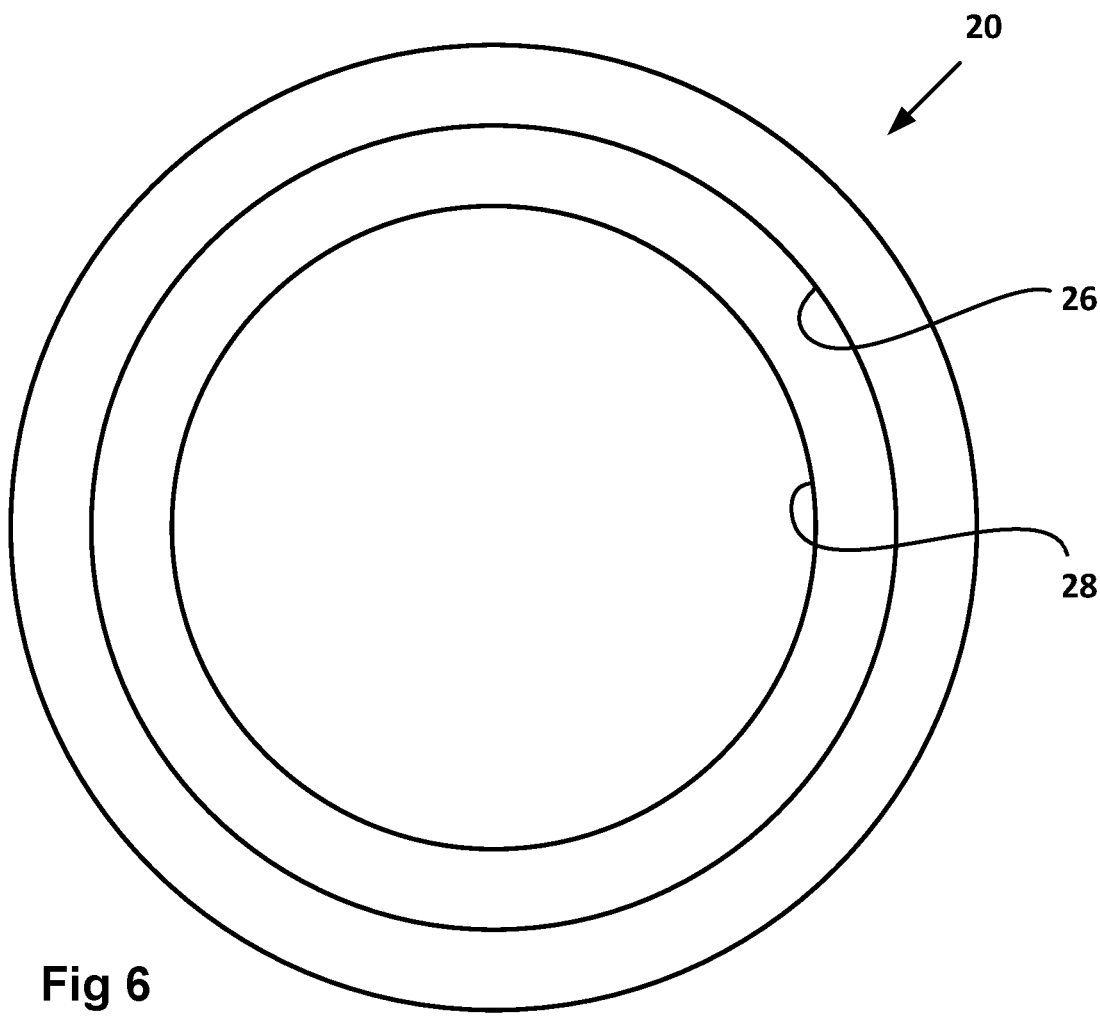
FIG. 6 is a plan view of the ring of FIG. 5.
Figure 7:
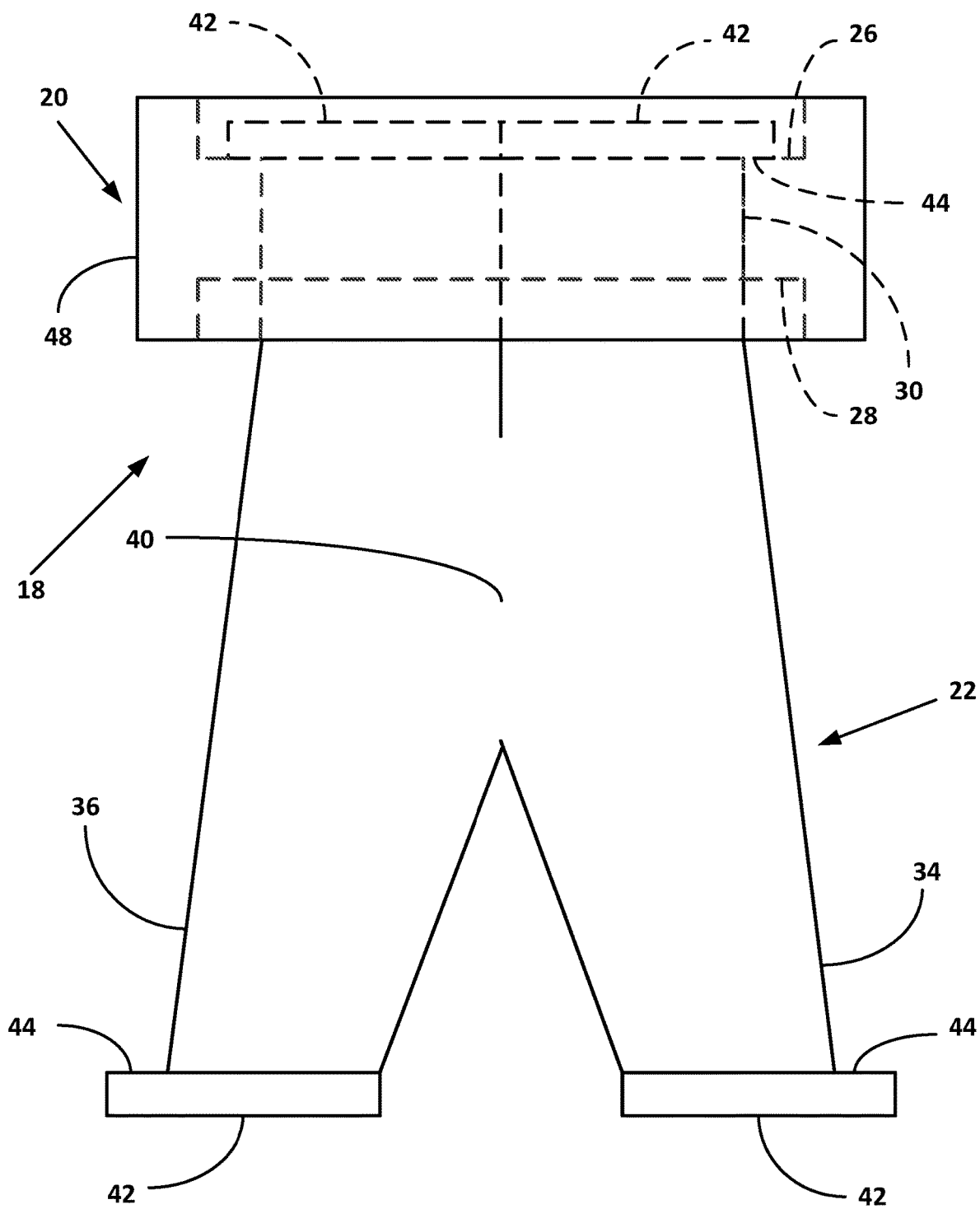
FIG. 7 is a side view of the marker of FIG. 4 with the insert having been slid from the neutral position shown in FIG. 4 to a lockable position (a position where it may lock into a reactor tube)
Figure 8:
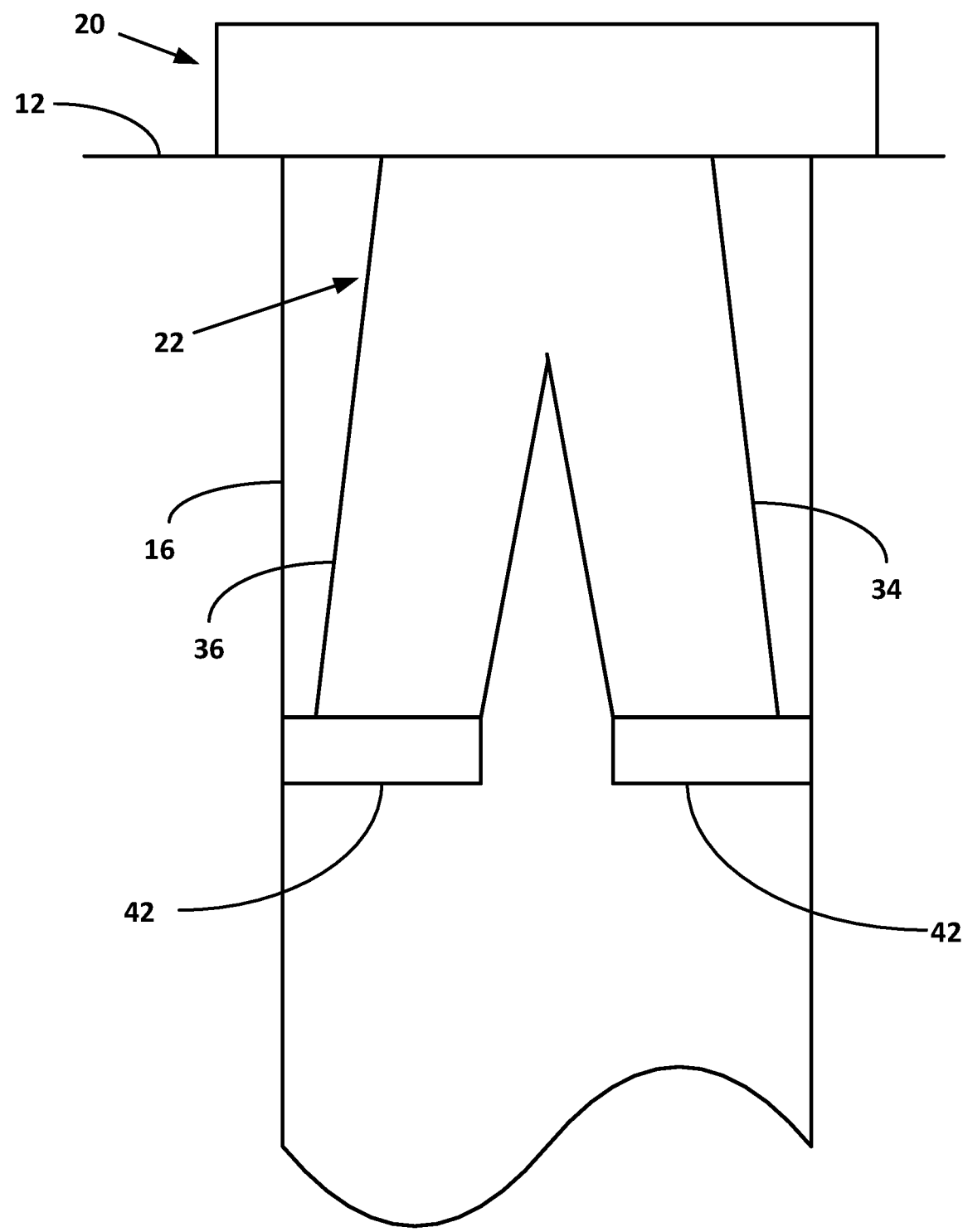
FIG. 8 is a broken-away side view of a tube in the tubesheet with the marker of FIG. 7 inserted into the tube.
Figure 13:
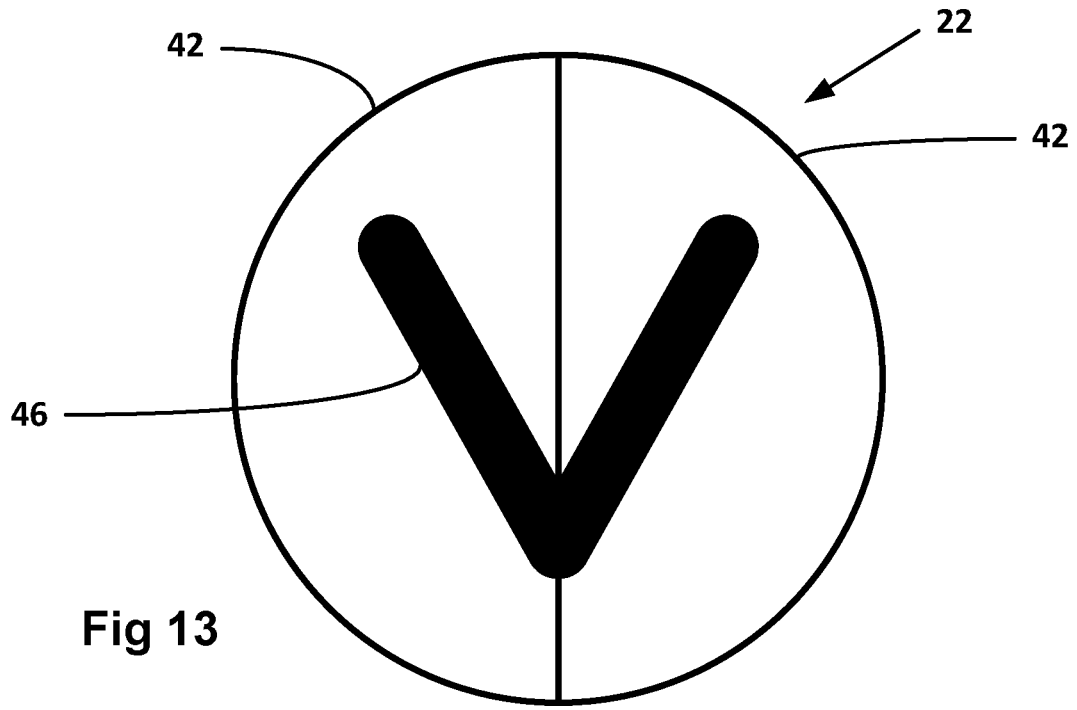
FIG. 13 is a plan view of the insert of FIG. 7, with the ring omitted for clarity and showing a unique code assigned to the insert and with the insert in the contracted position.

As shown in FIG. 4, the insert 22 is substantially "X"-shaped, defining a set of two upper arms 30, 32 as well as a set of two lower legs 34, 36 joined together by a solid "torso" 40, as best seen in FIG. 7. This insert 22 preferably is manufactured from an elastic material, perhaps rubber, which will allow the two arms 30, 32 (and the two legs 34, 36) to be pushed together to a contracted position when needed, as shown in FIGS. 7 and 13, and which will bounce back to its "natural" expanded position, as demonstrated by the legs 34, 36 in FIG. 7 (or to its partially expanded position as shown in FIG. 8, and as explained in more detail later). Even though this embodiment shows the length of the arms 30, 32 being substantially the same length as that of the legs 34, 36, this is not necessary. The length of the arms 30, 32 may be longer or shorter than the length of the legs 34, 36. It also should be noted that each of the arms 30, 32, and the legs 34, 36 terminates in a flat, substantially rectangular-in-cross-section plate 42 which defines an inner shoulder 44, as shown in FIG. 7, designed to rest upon the respective recess 26, 28 of the ring 20.

Figure 14:
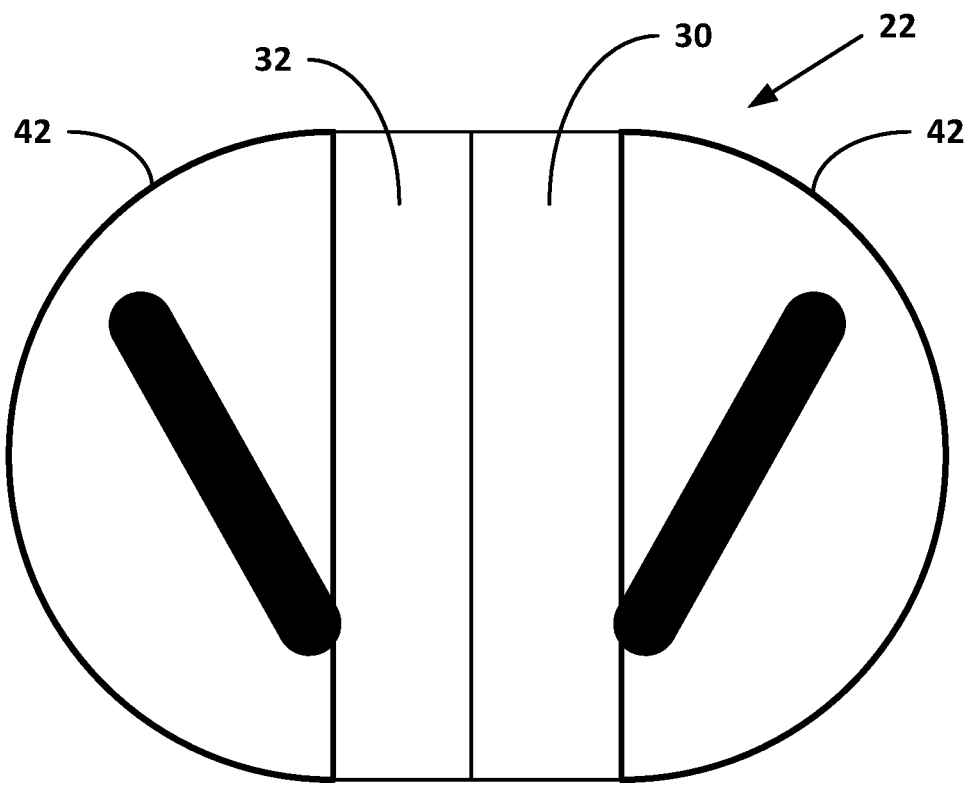
FIG. 14 is a plan view of the insert of FIG. 13 with the insert shown in the expanded position.

FIGS. 13 and 14 show a top or plan view of the insert 22 of the marker 18. In FIG. 13, the arms 30, 32 are in the contracted position, pushed together when the operator (not shown) pushes down on the insert 22 until the shoulders 44 of the plates 42 of the insert 22 impact against the ledge of the recess 26 of the ring 20. The arms 30, 32 are held in this contracted position by the walls of the through opening 24, as shown in FIGS. 7 and 8. In this embodiment, the thickness of the flat plate 42 is shallower than the depth of the recess 26 in the ring 20. As a result of this, any indicia or data placed on the surface of the plate 42 are below the top surface of the ring 20 and are consequently substantially protected against abrasion by foot traffic.

A code 46, in this instance a letter "V", is placed on the surface of the plate 42. This code 46 may be attached by any known means, such as printing, etching, gluing, welding, or screwing it to the plate 42. The code 46 is shown to be a letter "V" but may in fact be any unique code attached to this marker 18. In practice it is preferable to use a code which is readily read and interpreted digitally, such as a UPC (universal Product bar code) or a QR (Quick Response) code. While those codes are read visually, it also would be possible for the code to be something that could be read in a different manner, such as a radio transmitter transmitting a very localized signal, which could be read by a receiver instead of a camera. The code 46 may be placed on one or the other of the plates 42 of the two arms 30, 32 if there is enough room to do so. Failing that, the code 46 may be split in two sections, with one portion on each of the plates 42, as seen in FIG. 14 wherein the code "V" has been split, with part of the "V" on each of the plates 42.

The code 46 is preferably placed on both the arms and the legs of the insert 22. As explained later, this feature allows for easier tracking of tasks both before and after completion. Second, the code 46 may also (or instead) be placed on the ring 20, perhaps around the outer edge (rim) 48 (See FIG. 7) of the ring 20. A UPC bar code is probably the easiest one to read if the code 46 is on the rim 48 of the ring 20. Finally, the plates 42 for each of the arms 30, 32 may be a different color from the plates 42 for each of the legs 34, 36. For instance, the plates 42 for the arms 30, 32 may be red and the plates 42 for the legs 34, 36 may be green. This makes it easier to identify, at a glance, what tubes have already been worked on, as discussed in more detail later.

To assemble the marker 18, the user squeezes the arms 30, 32 (or the legs 34, 36) tightly together and pushes the insert 22 through the through opening 24 of the ring 20. Note that the plates 42 will need to deform slightly and temporarily in order to get past the ledge of the recess 26 and through the opening 24 before popping back out once they have cleared the ring 20. To install the marker 18 in a tube 16, the user squeezes together the legs 34, 36 of the insert 22 and pushes the marker 18 into the top opening of the tube 16 until the ring 20 is resting against the top tubesheet 12 of the reactor 10 (See FIG. 8) and the plates 42 of the arms 30, 32 are bottomed out against the ledge of the recesses 26 of the ring 20. The legs 34, 36 will automatically bounce back to their expanded (or at least partially expanded) positions as shown in FIG. 8, pushing against the inner wall of the tube 16, locking the marker 18 onto the tube 16. The user should be careful to insert all the markers 18 into the tubes 16 with the same color plates 42 visible (that is, all the markers 18 should be inserted either legs 34, 36 first or arms 30, 32 first), assuming that the plates 42 of the arms 30, 32 are a different color than the plates 42 of the legs 34, 36.

Alternatively, the marker 18 may be inserted upwardly from the bottom of the lower tubesheet 14 (See FIG. 1) in the same manner as has been described for inserting it downwardly from the upper tubesheet 12, except that the respective plates 42 bottom out against the bottom of the ring 20, and the legs 34, 36 press against the inner wall of the tube 16 and hold the ring 20 up against the bottom tubesheet 14. Of course, the arms 30, 32 and the legs 34, 36 may be switched interchangeably, that is, the legs 34, 36 may be the ones inserted in the tube 16, as has already been described, or the arms 30, 32 may be the ones inserted in the tube 16 with substantially the same result, except, of course, if the plates 42 on the arms 30, 32 are of a different color than the corresponding legs 34, 36, then there will be a visual difference in the resulting color of the "marked" tubesheet. As explained later, a difference in color may be used to keep track of the tubes which already have been worked on.

Figure 9:
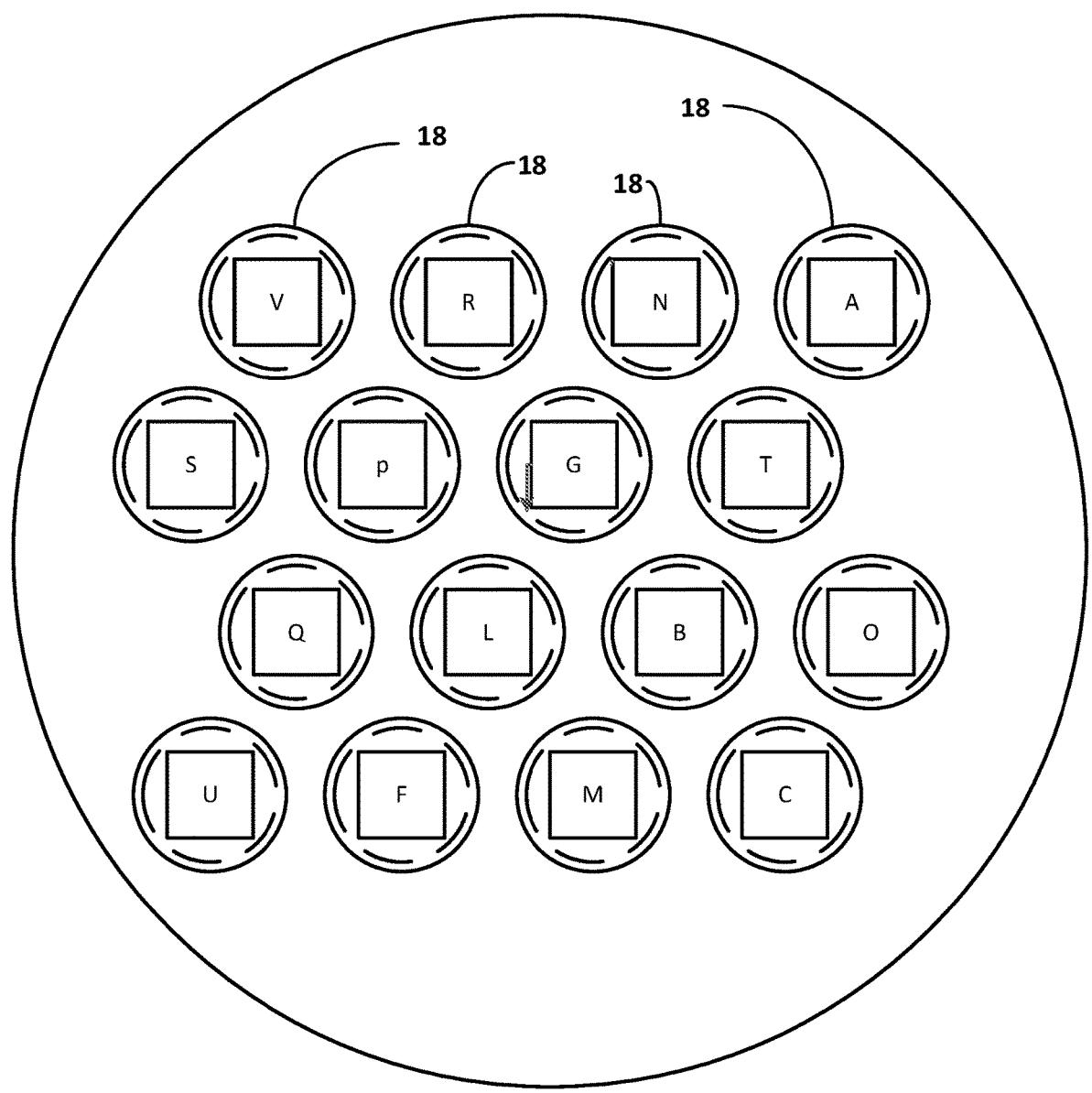
FIG. 9 is plan view of a tubesheet, similar to that of FIG. 2, but showing a much smaller tubesheet with considerably fewer tubes, each tube marked with its own, unique identifier code (which, in this instance, is a letter of the alphabet)

FIG. 9 is a plan view of a miniature sample tubesheet with 16 tubes, each of which has a marker 18 with a unique code 46. For instance, the first (or top) row has four tubes marked with the codes "V", "R", "N", and "A" respectively. So, the first tube in row 1 is marked with the code "V", the second tube in row 1 is marked with the code "R", the third tube in row 1 is marked with the code "N", and the fourth tube in row 1 is marked with the code "A". It will be noted that each marker 18 has a unique code, so that marker can be correlated to a unique tube 16.

Figure 10:
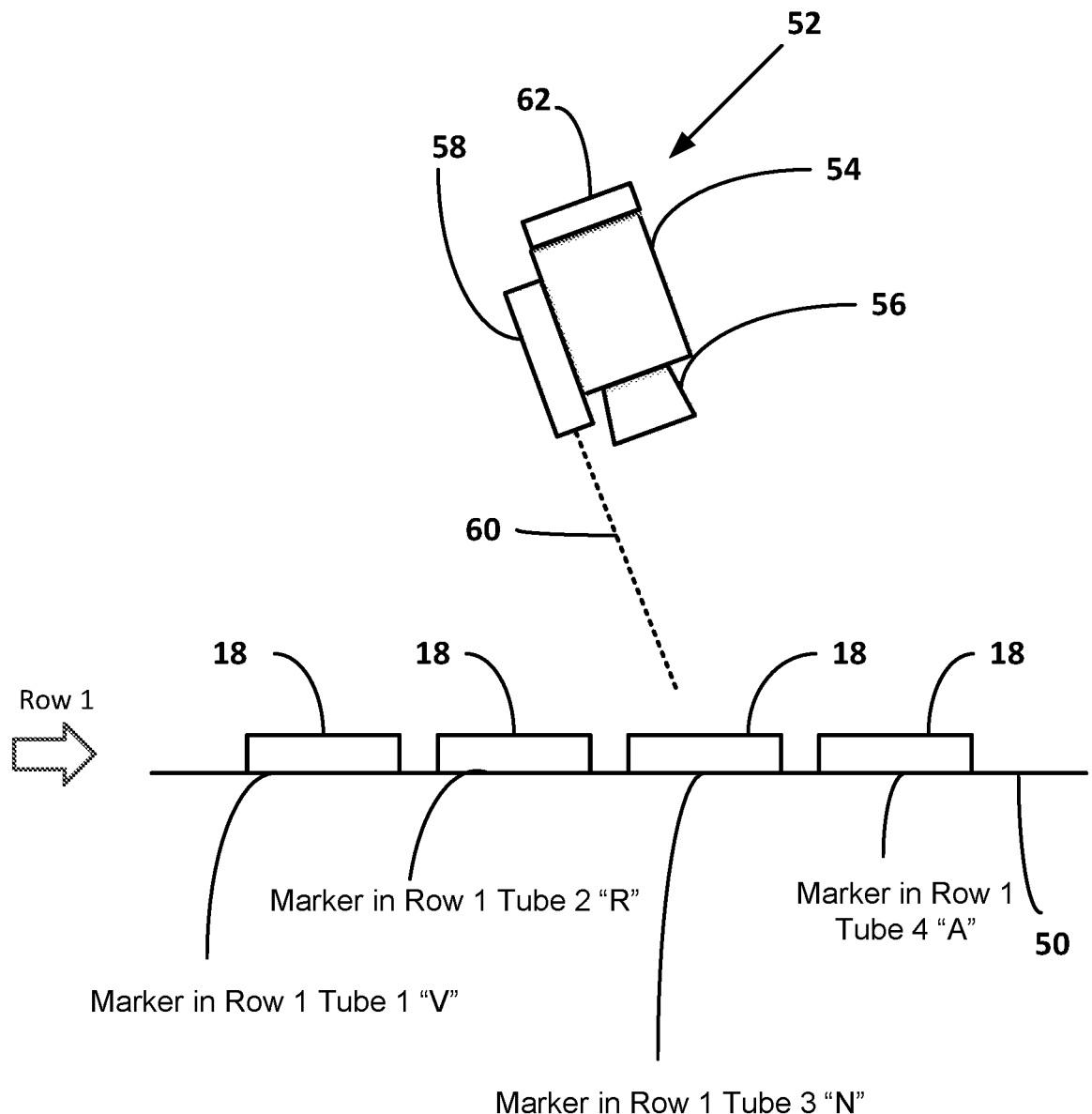
FIG. 10 is a schematic, side view of a camera taking a reading of each unique identifier code on each marker for each tube.

FIG. 10 shows a camera arrangement 52 which includes a camera 54, a camera lens 56, a control panel 62, and a laser pointer 58 which shines a laser beam 60 onto each marker 18 in order to read and log the code 46 on each marker 18, as described in more detail below. As mentioned earlier, if the unique code is to be read by something other than a camera, such as a radio signal receiver, then that reader would be used instead of the camera 54.

Figure 11:
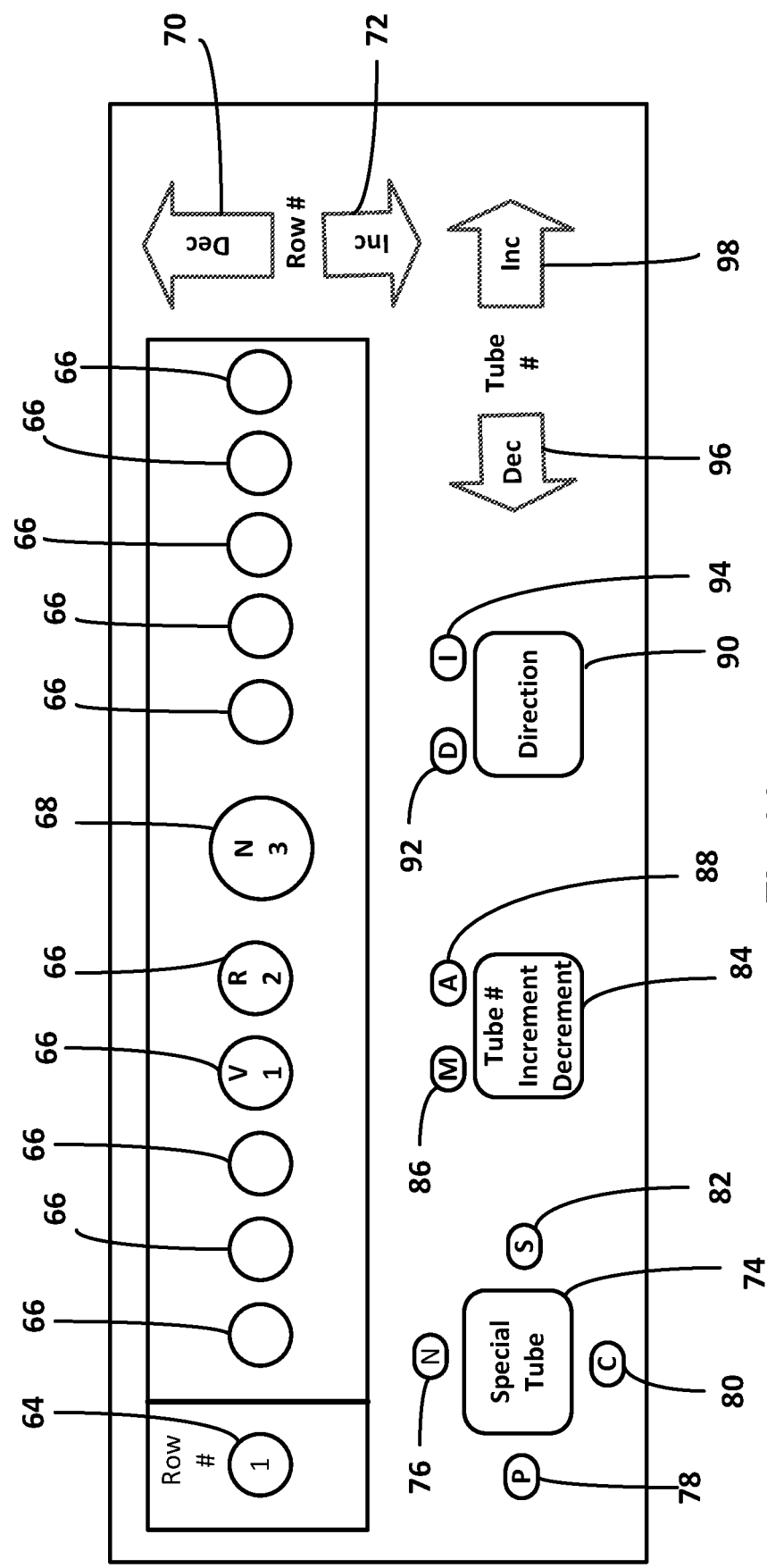
FIG. 11 is a plan view of the control panel for the camera arrangement of FIG. 10.

FIG. 11 is a plan view of the control panel 62 for the camera arrangement 52 of FIG. 10. The control panel includes a plurality of displays including:

Display 64 which indicates the current row number.

Display 66 which indicates the tube #'s and codes already recorded or to be recorded for that row number.

Display 68 for the current tube # and code.

The control panel 62 also includes a plurality of buttons or toggle switches for the user to select the desired operating mode and indicator lights to indicate the mode that has been selected including:

Toggles 70, 72 to manually decrement and increment the row number displayed in Display 64

Button 74 to enable manual selection of the type of tube currently being recorded Indicator light 76 to indicate that the tube type of a Normal tube has been manually selected.

Indicator light 78 to indicate that the tube type of a Plugged tube has been manually selected.

Indicator light 80 to indicate that the tube type of a Coolant tube has been manually selected.

Indicator light 82 to indicate that the tube type of a Support tube has been manually selected.

Button 84 to choose whether the tube # increment or decrement shall be done manually or automatically Indicator light 86 to indicate that manual increment or decrement of the tube # has been selected.

Indicator light 88 to indicate that automatic increment or decrement of the tube # has been selected.

Button 90 to choose the row tagging direction (decreasing tube numbers D or increasing tube numbers I) if it is to be done automatically Indicator light 92 to indicate that the selected row tagging direction is in decrement, if it is to be done automatically Indicator light 94 to indicate that the selected row tagging direction is in increment, if it is to be done automatically Toggles 96, 98 to decrement and increment the tube # (if the button 84 has been pressed to select manual increment or decrement of the row #)

It should be noted that the control panel alerts the user when a reading has been completed. This alert may be done visually (a light may shine momentarily when the reading is complete), or audibly (a beep sounds when the reading is complete), or through the sense of touch (a short vibration is felt when the reading is complete), or via any combination of the above. The user presses a button or trigger (not shown) when he has moved the camera arrangement 52 to the next position and is ready to scan another marker 18.

Method of Operation:

To use these universal markers 18 to keep track of the status of tubes 16 in a tubesheet, the user first installs one unique marker 18 in each tube 16. The markers 18 are all pre-printed (or otherwise marked) with a unique code 46. The order in which these markers 18 are inserted into the tubes 16 is irrelevant; it does not matter which marker 18 goes into which tube 16. Once all the tubes 16 have their own unique marker 18, the operator uses the camera arrangement 52 of FIG. 10 to read the unique code 46 on each marker 18 and correlates this marker 18 with a unique tube location, using the information shown in the control panel 62. As the camera records the unique code 46 on each marker 18, that unique code 46 is correlated to the unique tube location of that marker 18. So, for example, on the schematic tubesheet of FIG. 9, he correlates the image of the code letter V recorded by the camera 54 with row 1, tube 1. Then he correlates the image of the code letter R recorded by the camera with row 1, tube 2, and so forth. The correlation is recorded and stored.

Figure 12:
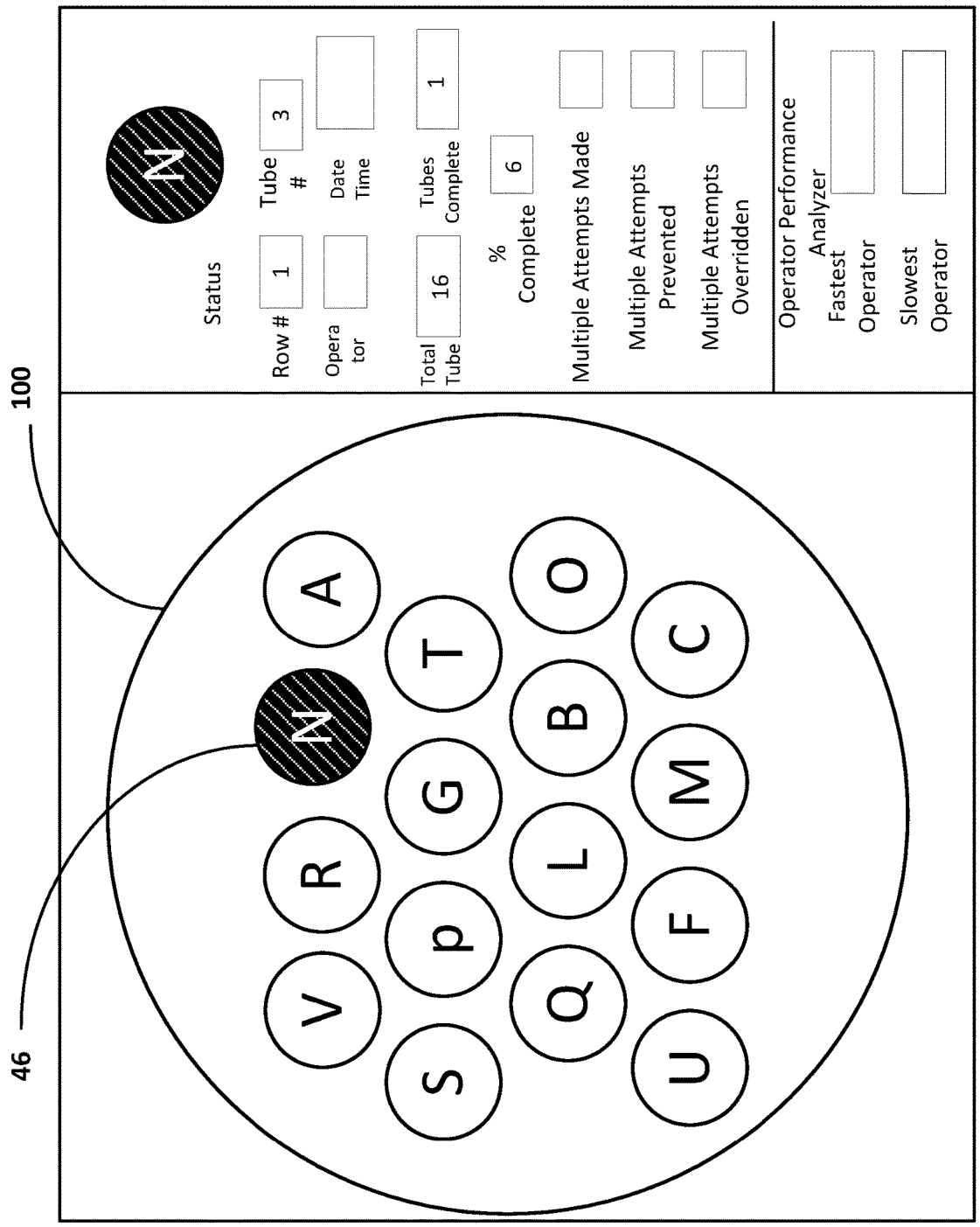
FIG. 12 is a screen view of the computer gathering and displaying the information transmitted by the camera arrangement of FIG. 10.

The location of each tube 16 is now identified by the unique code on its corresponding marker 18. If the markers 18 are also color coded, that is, if each of the arms 30, 32 is a given color, say red, and each of the legs 34, 36 is given a different color, say green, and if all the markers 18 have been inserted in a consistent manner, say legs first, then the whole tubesheet will be covered by red markers 18. This gives immediate feedback to the inspector of the current status of the tubes in the reactor (in this instance red could mean that no task has yet been performed). The digital information collected via the camera arrangement 52 is all streamed to a computer and may be displayed on a remote monitor as shown in FIG. 12 in order to give the supervisor real-time feedback of the current status of the tubes.

All the information read via the camera arrangement 52 is uploaded to a computer (not shown). FIG. 12 is a screen shot of the display on the computer gathering the information transmitted by the camera arrangement 52. It includes a visual representation 100 of the tubesheet 50 of FIG. 9 showing all the tubes 16 together with their unique identifier codes, which in this example is a series of letters but which may be anything desired, including a bar code, a Q code, or simply the row and tube number of each tube 16.

Now, as an operator begins to work on a task on a specific tube (in this example the tube labeled "N"), he takes a laser reading with a handheld device (not shown, but which may be similar to the camera arrangement 52, or similar to a simple UPC code scanner as found in most retail establishments) and scans the code 46 of the tube he is about to work on. This information is transmitted in real time to the computer which shows a screen similar to that of FIG. 12. The computer knows which tube position is correlated with the code 46 on that tube, and it produces a display with a representation of the tubesheet 100, highlighting the location of the tube 16 to be worked on with its unique code "N". On the side bar of the display, it also shows that the tube "N" is to be worked on, the location of the tube "N" by row # and tube #, the name or initials of the operator doing the work, the current date and time, the total number of tubes in the tubesheet, the number of tubes that have been completed (the task has been successfully completed on these many tubes), and the percentage of the total tubes that have been completed.

The screen also provides additional information such as how many attempts have been made at completing the task on this tube, how may multiple attempts have been prevented (that is, for instance, the task on this tube has already been reported as completed so the operator should not be doing the same task again on this particular tube), and the number of multiple attempts which have been overridden (that is, the operator acknowledges that the record shows that the task has been completed but he must proceed to do it again, perhaps because it was not done correctly initially).

Finally, the computer also can track and display information about the operator's performance in comparison with that of other operators doing similar tasks, such as who is the fastest operator (gets the tasks completed most quickly) and who is the slowest operator. This information can be used to determine which operator needs additional training to improve performance and which operator should be emulated to improve overall team performance.

The operator getting ready to perform the task on a particular tube, after scanning the marker 18 corresponding to the tube he is about to work on, will get feedback on his scanner from the computer indicating whether he may proceed (that is, no task has yet been performed in this tube). He removes the marker 18 from the tube (by tugging upwardly on the ring 20 to dislodge the marker 18 from the tube 16), performs the task to be completed on the tube, flips the marker 18 upside down so that now the green legs of the insert 22 are visible instead of the red arms, and reinserts the marker 18 into the tube. It is contemplated that the operator may take a second reading of the code 46 on the marker 18 of the tube on which he just completed work (thus the advantage of having the code 46 on both the arms and the legs of the insert 22) so as to indicate and confirm that the task on this tube has been completed. The computer may then change the physical status of the corresponding tube on the screen, by changing its color, for instance (as indicated by the crosshatching on the letter "N" of the tube). The computer also may keep track of the amount of time it took the operator to complete the task (time elapsed between the first code scan to start the task and the second code scan indicating the task is complete) and compare it against a standardized time to determine if there might have been some problem with this tube during the performance of the task. Also, now both the actual tube on the tubesheet and the corresponding tube on the screen show a different color so that a supervisor can get a very quick visual representation of the amount of headway made in completing the tasks on all the tubes on the entire tubesheet.

Figure 15:
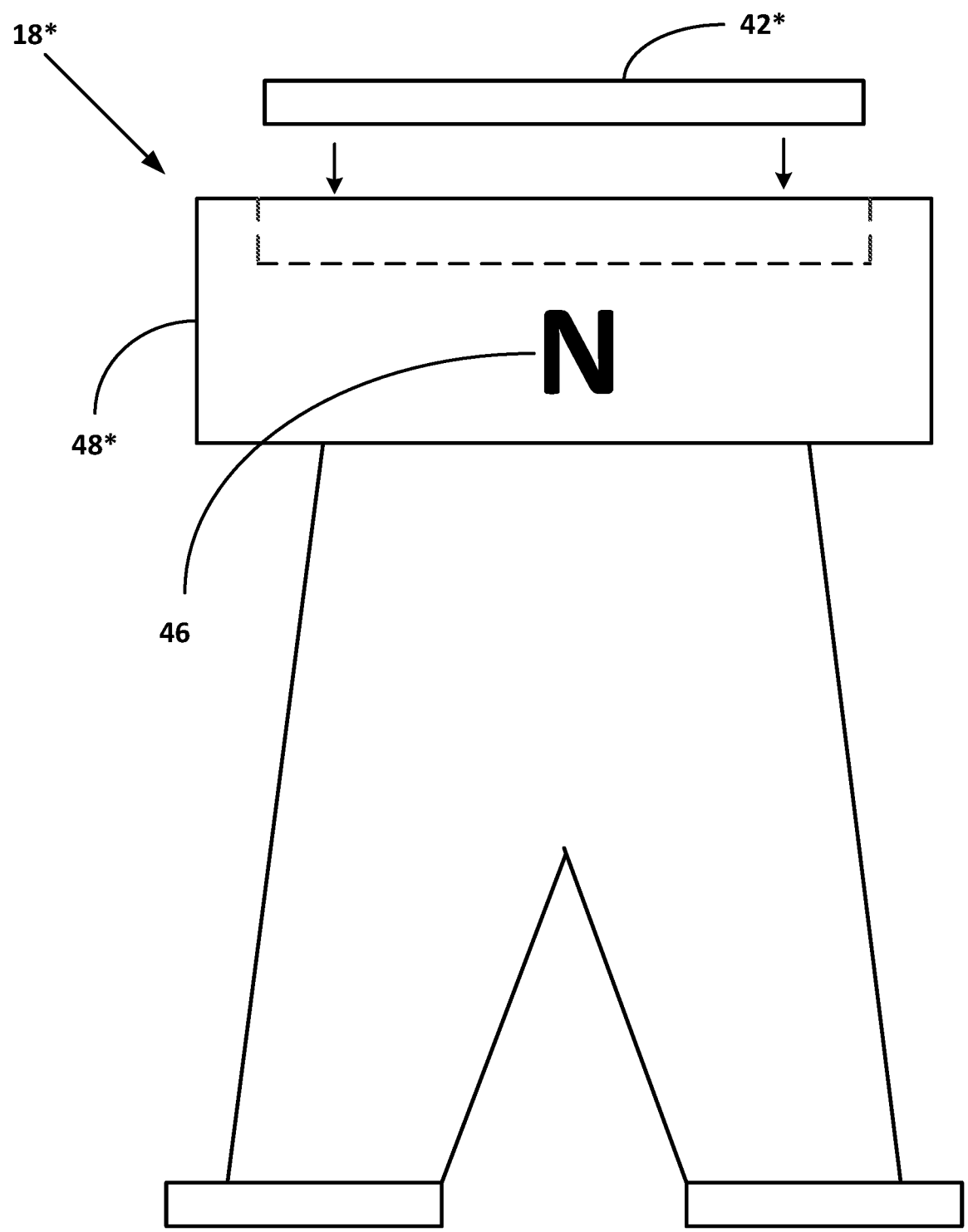
FIG. 15 is a side view of another embodiment of a universal marker.

It should be noted that the marker 18 need not have the two-part configuration of the first embodiment. FIG. 15 shows another embodiment of a marker 18* which is a single piece. This marker 18* preferably is made from a rubber-like material to allow for the legs of the marker 18* to be pressed together to go into a tube and then automatically bounce back to lock onto the inside surface of the tube. The code 46 for this marker 18* preferably is located on the rim 48* of the marker 18*. A separate disk 42* may be inserted in the recess 26* of the marker 18* (as depicted by the arrows) should the user wish to change the color of the marker 18* without covering up the code 46*.

This procedure may be followed for any task to be performed on the tubes. It may be that the procedure begins with all the markers 18 showing their red side, a first task is performed, with the markers 18 being turned upside down to show their green side when that first task is completed, and then a second task begins with the markers starting out in the upside-down (green side) position and turned over to the red position as the second task is completed, and so forth.

Figure 2:
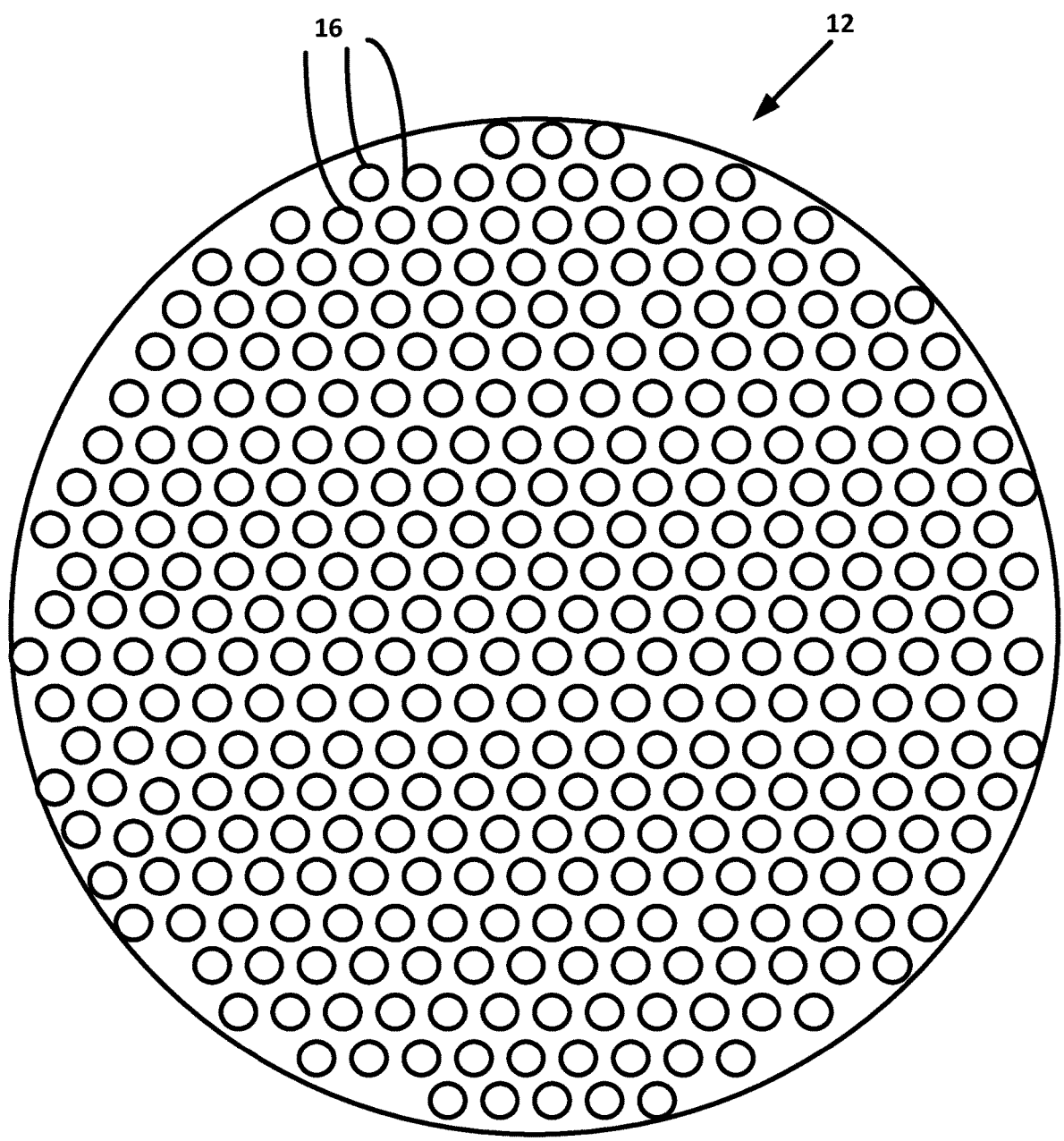
FIG. 2 is a plan view of the upper tubesheet of the reactor vessel of FIG. 1.
Figure 3:
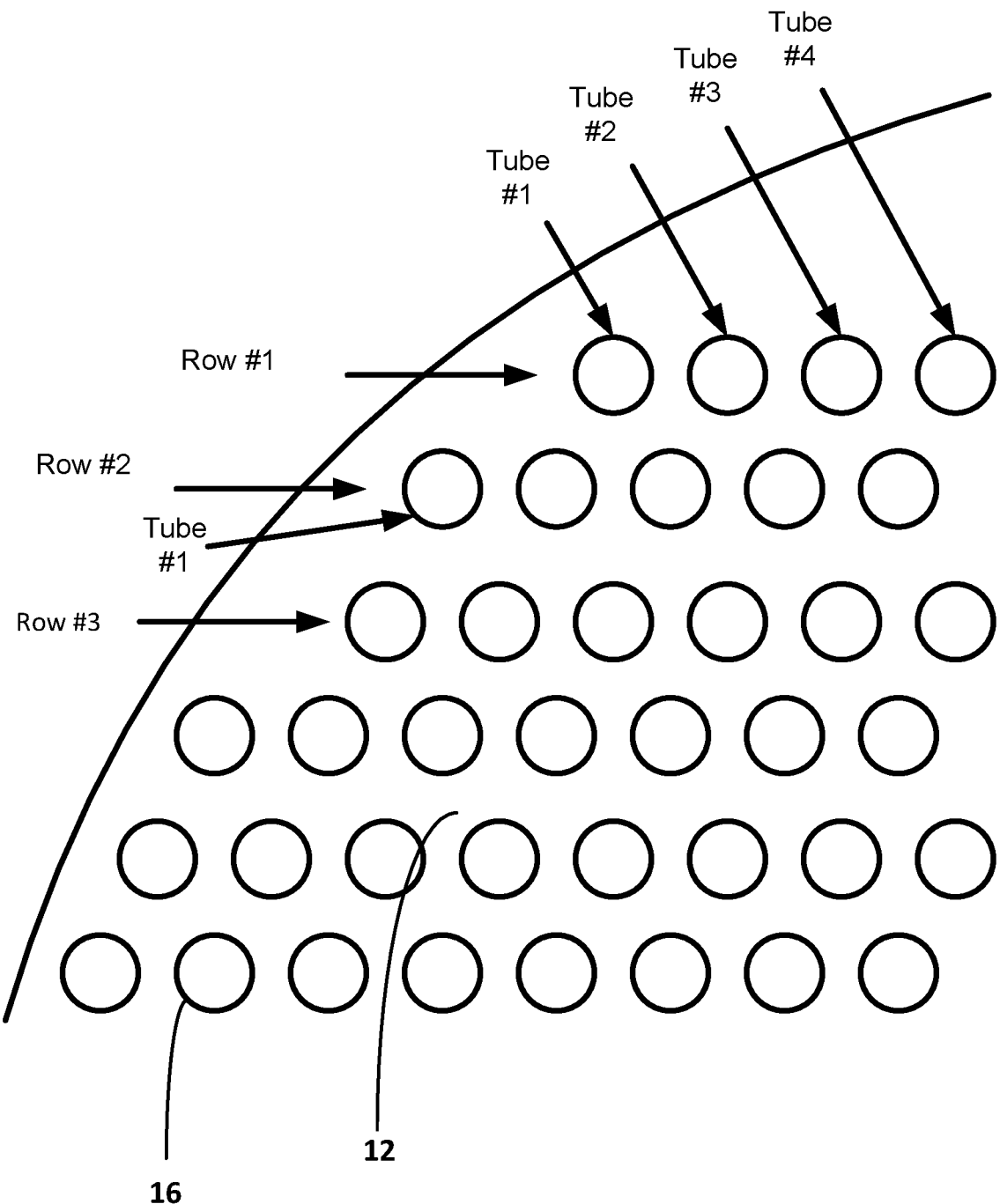
FIG. 3 is a detailed, broken-away view of one sector of the tubesheet of FIG. 2.
Figure 16:
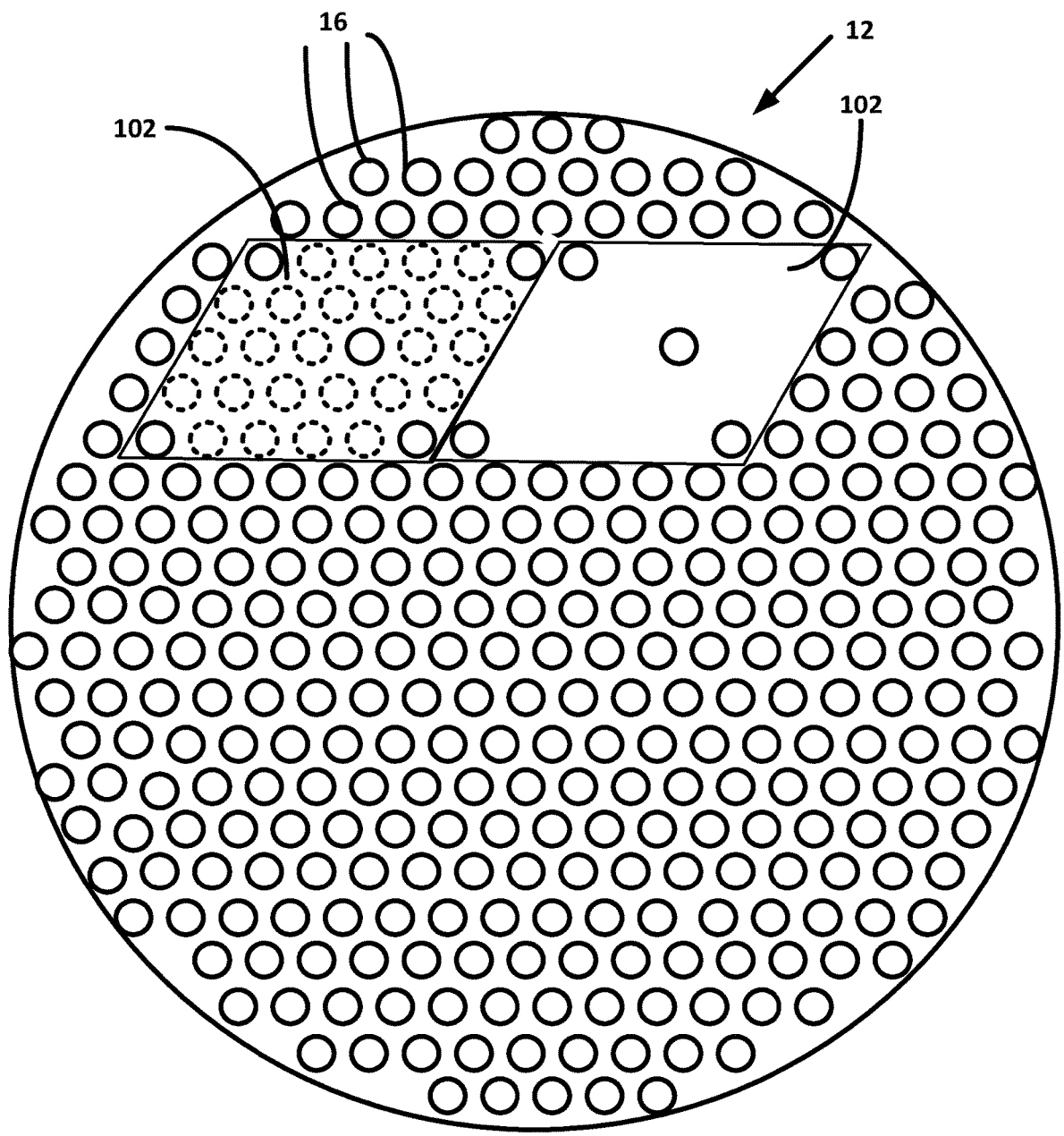
FIG. 16 is a plan view of the tubesheet of FIG. 2 but with another embodiment of a unique tube identifier which covers a sector of the tubesheet, including a plurality of tubes, instead of covering a single tube.

FIG. 16 is similar to FIG. 2 but showing two embodiments of a sector marker 102 which may be used to uniquely identify a sector of the tubesheet 12 covering a plurality of tubes 16. In the sector marker 102 on the left, the tubes 16 covered by the marker 102 are shown in phantom. The sector marker 102 on the right shows that the tubes 16 under this marker 102 are in fact covered up by the marker 102.

Figure 17:
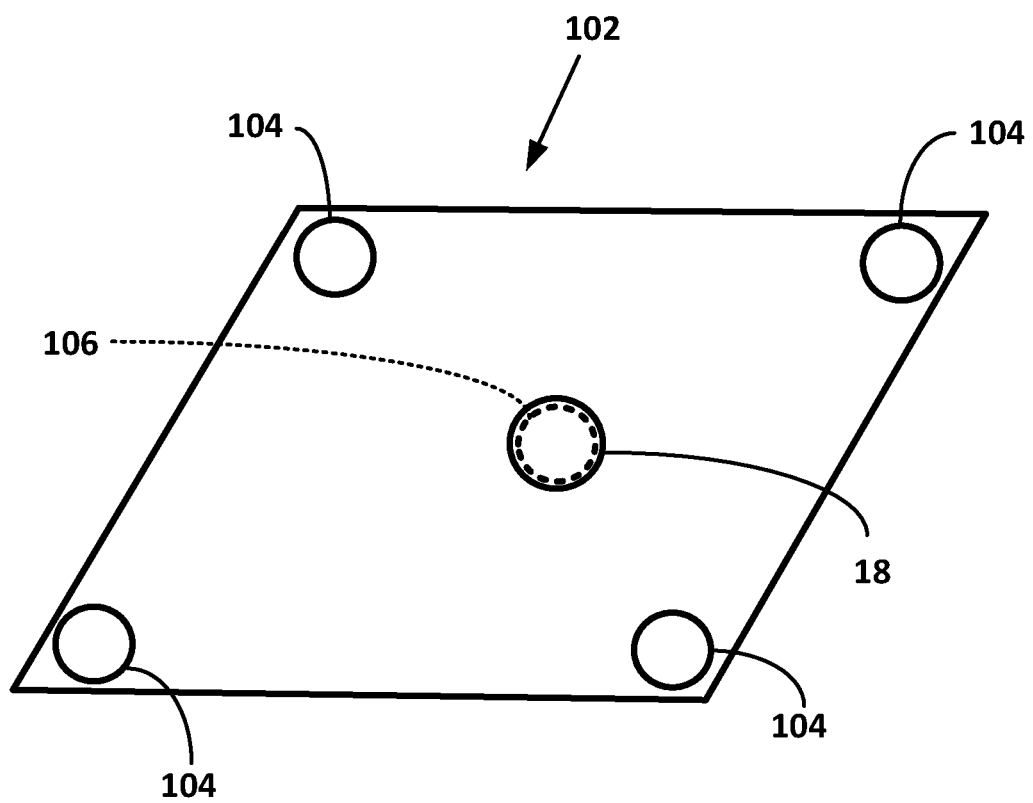
FIG. 17 is a plan view of the sector identifier of FIG. 16.

Referring now to FIG. 17, in this embodiment the sector marker 102 is a parallelogram-shaped template that fits over a plurality of tubes 16 on the tubesheet 12. Of course, the sector marker 102 may have any shape needed in order to cover up the desired tubes 16. Each sector marker 102 may cover as many tubes 16 as desired, the limitation being the ease of handling, installation, and removal of the sector markers 102 from the tubesheet 12. The sector marker 102 is secured to the tubesheet 12 via pins 104, preferably located at, or near, the corners of the sector marker 102. An opening 106 is available for the installation of a marker 18, such as one of the universal markers 18 described earlier. This marker 18, like the marker 18 described earlier, includes a bar code to uniquely identify the sector marker 102, and therefore also all the tubes covered by that particular sector marker 102.

The sector marker 102 preferably is made from a hard material, like metal, or a tough material, such as rubber. If made from a thick rubber mat, the sector marker 102 would allow the user to walk over/on the mat. The rubber material would also serve to help seal the covered tubes 16 to prevent any unwanted materials, such as grit, catalyst pellets, cleaning swabs, or any loose hardware (nuts, bolts, etc.) from falling into the tubes 16 and it could also seal the tubes to prevent any updraft through the tubes.

A plurality of sector markers 102 may be arrayed to cover some, all, or most, of the tubesheet 12. The sector markers 102 may overlap each other to fully cover the tubesheet 12. Each sector marker 102 is picked up in turn, in order to do the required task on the tubes (unload catalyst, clean, swab, reload, test). The bar code is read upon removing the sector marker 102 and the task noted as done when replacing the sector marker 102 (the color of the marker 18 on the sector marker 102 may be changed to give a visual indication of the tasks completed). Thus, the markers 18 may be used to uniquely identify particular tubes 16 on a tubesheet 12, and/or to identify sectors of the tubesheet 12, each sector covering one or more tubes 16.

FIGS. 18-21 show another embodiment of a universal tube marker 108. The marker 108 preferably is designed to be manufactured as a single piece unit, and this may be accomplished by 3-D printing or by injection molding, for instance. Since a single reactor may have thousands, and even tens of thousands of tubes 16, it is advantageous to be able to provide an inexpensive, single piece marker 108 which may even be used as a throw-away item after the reactor process being monitored has been completed.

The marker 108 is comprised mainly of two cylindrical body portions. The main body portion 110 is a hollow cylinder having a first open end 112 and a cylindrical cap 114 closing off the second end 116. The main body portion 110 has an outside diameter which is slightly less than the inside diameter of the tube 16. The cap 114 has an outside diameter which is at least slightly larger than the inside diameter of the tube 16. As best appreciated in FIGS. 20 and 21, the cap 114 defines a substantially rectangular discontinuity or opening 115 in its circular cross-sectional profile.

Figure 18:
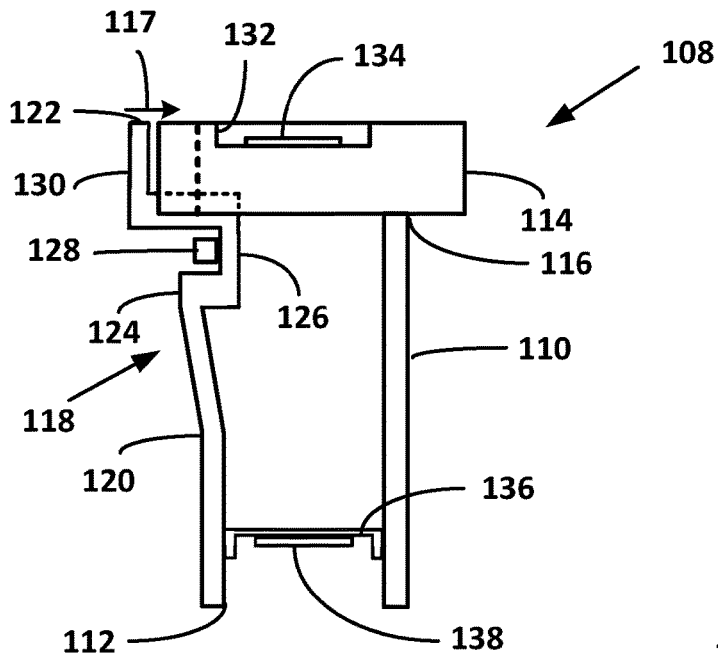
FIG. 18 is a side view of another embodiment of a universal marker.
Figure 19:
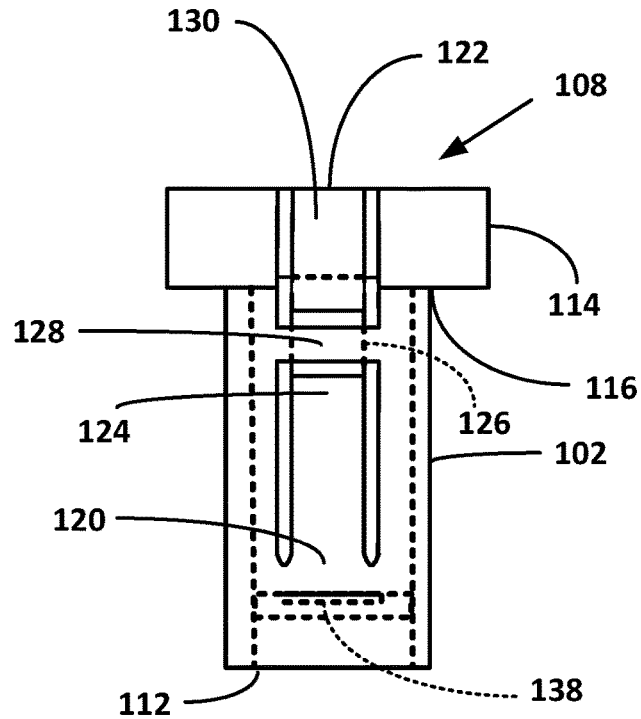
FIG. 19 is a front view of the universal marker of FIG. 18.

The main body portion 110 defines an extension or appendage 118 having a labyrinthine shape with a proximal end 120 being attached to the main body portion 110 and a distal end 122 projecting adjacent to the top edge of the cap 114, as best appreciated in FIG. 18. The labyrinthine shape extends from the first end 120 to a first leg 124 which, when the appendage 118 is in its "at rest" position, projects beyond the outside diameter of the main body portion 110, to a second leg 126 which extends back into the hollow portion of the main body 110 behind a portion 128 of the main body 110 (the portion 128 acts as a stop to prevent the appendage 118 from springing outwardly too much), and on to a third leg 130 which again projects outwardly of the outside diameter of the main body 110 and extends upwardly to the distal end 122.

Figure 21:
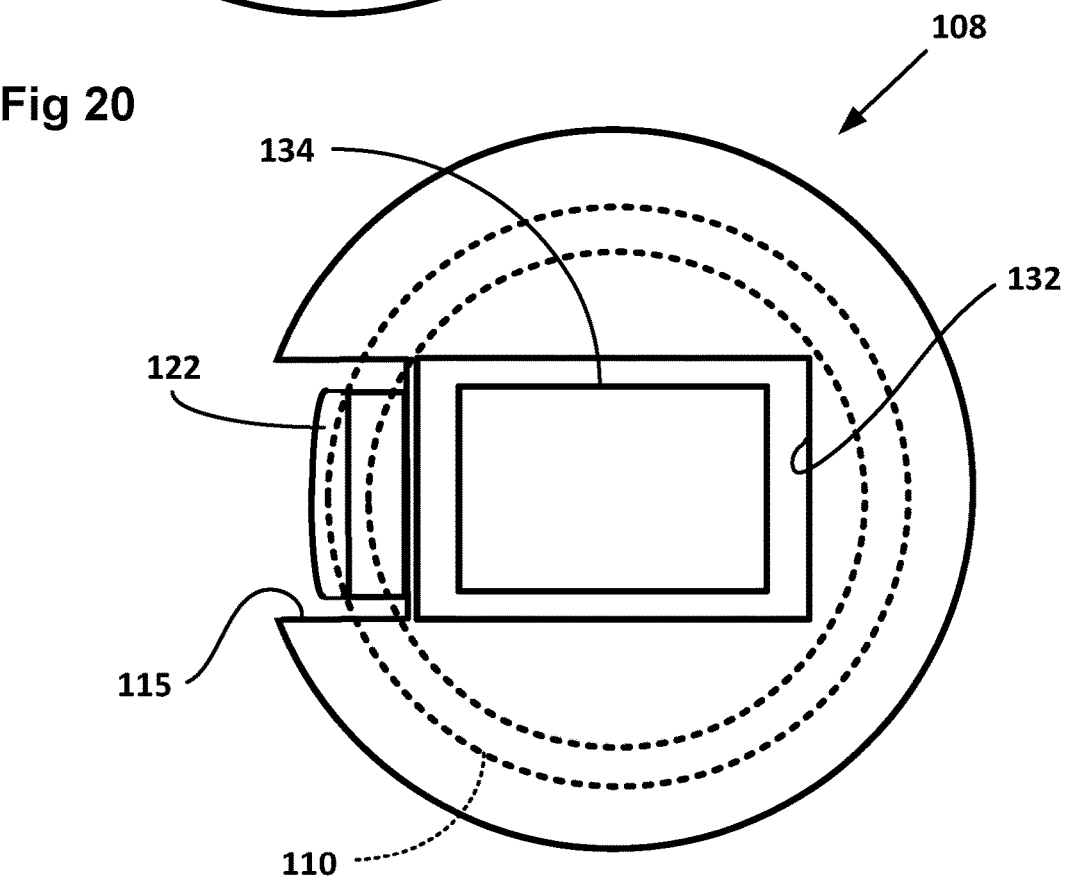
FIG. 21 is a plan view of the universal marker of FIG. 20 with its live hinge in its retracted position.

When the user depresses the distal end 122 of the appendage 118 such that the distal end 122 of the appendage 118 is pushed (in the direction of the arrow 117 in FIG. 18) into the opening 115 of the cap 114, as shown in FIG. 21, the first leg 124 of the appendage 118 is pushed inwardly until it is substantially flush with the outside diameter of the main body 110. The entire appendage 118 is hinging at its proximal end 120, with this proximal end 120 acting as a live hinge for the appendage 118. The user now can insert the marker 108 into the opening of a reactor tube 16, with the main body 110 inserted into the tube 16 and the cap 114 resting against the tubesheet. The user may now release the distal end 122 of the appendage 118 which then springs back due to the live hinge action of the proximal end 120. The first leg 124 of the appendage 118 pushes outwardly so as to wedge the main body 110 of the marker 108 against the inside surface of the tube 16.

The marker 108 resists efforts to be pulled out due to this frictional wedging action caused by the appendage 118 and the inside surface of the tube 16. It is not just the friction between the leg 124 of the appendage 118 against the inside surface of the tube 16 which resists efforts to pull out the marker 108; it is also the friction of the main body 110 against the inside surface of the tube 16 which resists efforts to pull out the marker 108 (since the main body 110 is biased against the inside surface of the tube 16 by the leg 124 due to the spring action of the live hinge 120).

Figure 20:
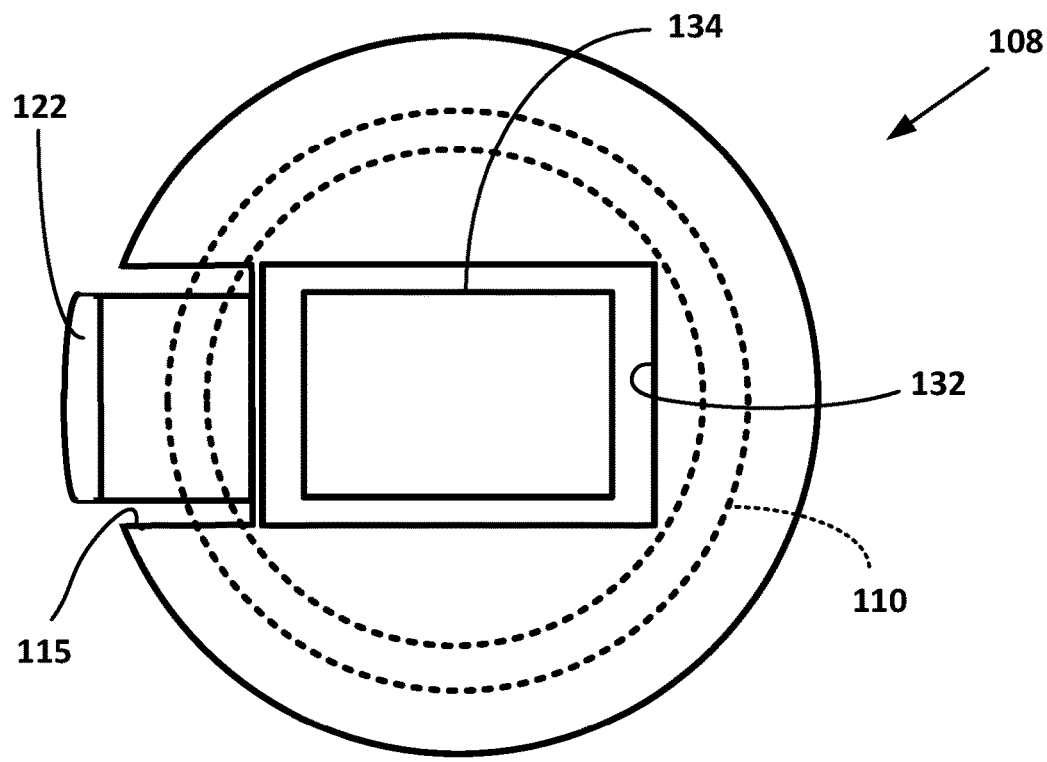
FIG. 20 is a plan view of the universal marker of FIG. 18 with its live hinge in its "at rest" position.

Referring now to FIGS. 18, 20, and 21, the cap 114 defines a recessed cavity 132 designed to receive the tag 134 which contains the unique identifier for the tube (as discussed earlier, this tag may a code, such as a bar code or a QR code which is easily machine readable, for instance). The recessed feature of the cavity 132 protects the tag 134 from being accidentally scuffed up or dislodged by an operator as he steps on top of a marker 108.

In some instances, the marker 108 may be installed projecting upwardly from the lower tubesheet instead of projecting downwardly from the upper tubesheet. In this case, it is possible for foreign matter (such a grit, dirt, swabs, etc.) to accidentally fall down through the tube 16 and come to rest inside the hollow main body 110, possibly preventing the user from depressing the distal end 122 of the appendage 118 so as to dislodge the marker 108 from the tube 16. To prevent this from happening, a lower cap 136, with a lower tag 138 (See FIG. 18) may be inserted and wedged into the open end 112 of the main body 110. The lower tag 138 preferably is identical to the tag 134 in the cap 114, and the lower cap 136 has substantially the same dimensions as the cavity 132 in the cap 114. Thus, if the tag 134 in the cap 114 is accidentally kicked off or otherwise lost or misplaced, the marker 108 can still be correctly identified by referring to the lower tag 138 in the lower cap 136. Furthermore, the lower cap 136 can be removed (if not otherwise secured to the main body 110, as by spin welding or gluing) from the main body 110 and relocated to the cavity 132 in the cap 114 to replace the lost tag 134.

The lower cap 136 prevents foreign material from entering the hollow portion of the main body 110 which may interfere with the hinge action of the appendage 118. Since this eventuality would likely only occur when using the markers 108 against the lower tubesheet, the possibility of the lower cap 136 coming loose from the marker 108 (if it is a press fit, for instance) is not only unlikely but also inconsequential in that the lower cap 136 would remain in the main body 110 of the marker 108 and would not fall out. An alternative could be to provide a slight shoulder, not shown, on the inside surface of the main body 110 for the lower cap 136 to come to rest upon when placed inside the main body 110 of the marker 108.

It will be obvious to those skilled in the art that modifications may be made to the embodiments described above without departing from the scope of the invention as claimed.

What is claimed is:

1. A method for keeping track of chemical reactor tubes when performing a task on the tubes, comprising the steps of:
providing a sector marker for placement over a tubesheet, the sector marker defining an opening for performing maintenance on an open tube located below the sector marker;
positioning the sector marker over the tubesheet by at least two pins extending below the sector marker;
respectively inserting the at least two pins in at least two tube openings below the sector marker;
placing a cap or plug on the open tube and/or removing a cap or plug disposed on the open tube during maintenance operation with the defined opening being configured to permit placement or removal of a cap or plug disposed on the open tube; and
performing maintenance on the open tube.

2. The method of claim 1 further comprising repositioning the sector marker in progressive fashion to perform maintenance successively on a plurality of open tubes.

3. The method of claim 2 further comprising:
inserting a unique marker into each open tube, said unique marker bearing a unique code;
using a code reader to read the unique code on each unique inserted marker and correlate that unique code with the unique tube location into which the respective marker is inserted to establish a digital map of the tube locations and the unique codes associated with the tube locations; then, when beginning the task, using a code reader to read the code on the marker in the specific tube on which the task is to be performed, then performing the task, and then generating a signal indicating that the task has been completed for that specific coded tube; and
repeating these steps for the plurality of open tubes.

4. A sector marker for placement over a chemical reactor tubesheet, the sector marker comprising:
a generally flat and rigid body having a relatively thin cross-section and defining an opening therethrough, the opening having dimensions configured to permit access to an open tube located below the sector marker for performing maintenance thereon, the generally flat and rigid body further having a tube opening cover portion configured to cover and conceal a plurality of tube openings and adapted to support a user walking over the tube opening cover portion and to prevent debris from entering covered tube openings during maintenance on the open tube location;
at least two pins extending below the sector marker;
wherein by respectively inserting the at least two pins in at least two tube openings below the sector marker, the sector marker is positioned and temporarily secured over the tubesheet for performing maintenance on the open tube.

5. The sector marker of claim 4 wherein the generally flat and rigid body is generally in the shape of a parallelogram.

6. The sector marker of claim 4 wherein the opening is defined generally in the center of the sector marker body.

7. The sector marker of claim 4 further comprising:
a unique marker configured to be inserted into each open tube, said unique marker bearing a unique code;
a code reader adapted to read the unique code on each unique inserted marker and correlate that unique code with the unique tube location into which the respective marker is inserted to establish a digital map of the tube locations and the unique codes associated with the tube locations; then, when beginning the task, using a code reader to read the code on the marker in the specific tube on which the task is to be performed, then performing the task, and then generating a signal indicating that the task has been completed for that specific coded tube.

8. A sector marker for placement over a chemical reactor tubesheet, the sector marker comprising:
a generally flat and rigid body having a relatively thin cross-section and defining an opening therethrough, the body having a pre-defined shaped template configured to fit over a first set of tubes adjacent a tube sheet, the opening configured to permit access to an open tube located below the sector marker for performing maintenance thereon, the generally flat and rigid body further having a tube opening cover portion configured to cover and conceal a plurality of tube openings and adapted to support a user walking over the tube opening cover portion and to prevent debris from entering covered tube openings during maintenance on the open tube location;
a set of at least two pins extending below the sector marker and located at or near a periphery of the sector marker body and configured to be received within respective at least two tube openings to secure the sector marker to the tubesheet at a desired location;
wherein the sector marker is adapted to be repositioned over the tubesheet by respectively inserting the at least two pins in at least two other tube openings below the sector marker for performing successive maintenance on a plurality of open tubes.

9. The sector marker of claim 8 wherein the generally flat and rigid body is generally in the shape of a parallelogram.

10. The sector marker of claim 8 wherein the opening is defined generally in the center of the sector marker body.

* * * * *